United States Patent [19]

Fussi et al.

[11] Patent Number: 5,011,919

[45] Date of Patent: Apr. 30, 1991

[54] MODIFIED HEPARINS AND OBTENTION PROCESS

[75] Inventors: Fernando Fussi, Lugano, Switzerland; Víctor B. Díaz; Richardo H. Dománico, both of Buenos Aires, Argentina

[73] Assignee: Ajorca S.A., Buenos Aires, Argentina

[21] Appl. No.: 302,361

[22] Filed: Jan. 27, 1989

[51] Int. Cl.$^5$ .................. C08B 37/00; A61K 31/00
[52] U.S. Cl. ................... 536/21; 536/124; 536/127; 514/822
[58] Field of Search ............. 536/21, 124, 127; 514/56, 822

[56] References Cited

U.S. PATENT DOCUMENTS

| | | | |
|---|---|---|---|
| 3,065,140 | 7/1959 | Velluz et al. | 536/21 |
| 4,510,135 | 4/1985 | Teng | 536/21 |
| 4,745,106 | 5/1988 | Griffin et al. | 536/21 |

*Primary Examiner*—Ronald W. Griffin
*Assistant Examiner*—Everett White
*Attorney, Agent, or Firm*—Fleit, Jacobson, Cohn, Price, Holman & Stern

[57] ABSTRACT

The present invention relates to modified heparins having antithrombotic activity.

The invention also relates to a process of preparing such modified heparins starting from water insoluble heparin ammonium quaternary complexes.

Finally, the invention relates to pharmaceutical compositions containing the above modified heparins.

3 Claims, No Drawings

MODIFIED HEPARINS AND OBTENTION PROCESS

BACKGROUND OF THE INVENTION

1. Field of the Invention

This invention refers to modified heparins having antithrombotic activity by oral administration, a method to obtain said heparins and pharmaceutical compositions containing them.

Heparin is one of the best known natural substances used in therapy due to its unreplaceable anticlotting and antithrombotic activity.

Heparin is a complex heteropolysaccharide made by repeating disaccharide units. Each unit comprises a uronyl residue bound to glucosamine-O- and N-sulfate.

Uronic acids in the sequence are alternatively: D-glucuronic, L-iduronic, L-iduronyl-2-sulfate.

Glucosamine is sulfated in positions corresponding to the amino and 6-hydroxy groups. In some sequences also a peculiar glucosamine trisulfate is found, having an extra hydroxy group in position 3. This glucosamine trisulfate, although representing only a small fraction of the total glucosamine in the heparin molecule, is basically significant for the anticlotting activity.

On this basis, the natural heparin could be described under the following formula:

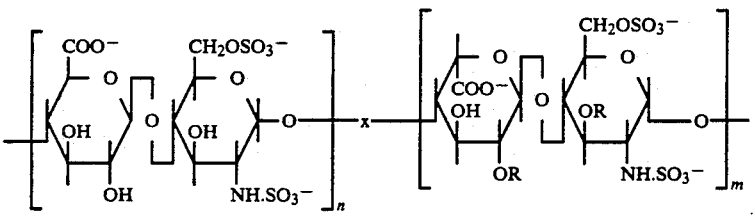

where: $R = H$ or $-SO_3^-$, $m/n$: 2:1, $m+n$ = about 20 (average).

This formula shows that the only hydroxy group that is always free in the heparin molecule is the one in position 3 of the uronic acid.

The many different biological and pharmacological activities of heparin are the consequence of intricate and partially not well understood biomolecular mechanisms. Actually, we know that the anticlotting activity of heparin is related to its specific link with a protease pro-inhibitor known as antithrombine III (At-III). The specific site in the heparin for the bond formation with At-III is a pentasaccharide sequence having glucosamine tri-sulfate in its centre.

On the other hand, the heparin anticlotting activity is not strictly necessary and proportional to its antithrombotic activity.

On the contrary, in many instances it is desirable to reduce the anticlotting activity whenever this activity can be identified with a hemorrhagic effect. In fact, some modified heparins having low anticlotting activity show an optimal antithrombotic effect. These preparations are considered as a great improvement on normal heparins, as they act with a therapeutical action of paramount importance in the prophylaxis of thrombosis jointly with a lower risk of hemorrhage.

It is now accepted that the antithrombotic effect can be roughly evaluated in vitro through the assay of the specific factor X activated inhibition (anti-Xa activity).

Unfortunately, heparin is active only when administered by parenteral route and is not orally absorbed.

The low or null biodisponibility of the orally administered heparin hampers its use in long term therapies and prevents patients in "thrombogenic state" from keeping constant levels of anti-Xa activity.

Heparin is not orally absorbed essentially for 3 reasons:

(1) It is a high molecular weight polymer (12000–15000 D) and there are no enzymatic mechanisms in the digestive tract or in the bloodstream able to split heparin molecule.

(2) It is an extremely hydrophylic substance (partition coefficient in n-octanol/water less than 0.01).

(3) It is a highly ionizable compound.

2. Description of the Prior Art

The heparin controlled depolymerization can be obtained through various methods described in the literature: nitrous acid treatment, beta-elimination, peroxydolysis, atomic oxygen action, molecular sieve fractionation. Therefore, at present, it is quite simple to obtain heparin fractions having a mean molecular weight $(\overline{MW})$ lower than the commercial heparin, showing high anti-Xa and low anticlotting activity (LMW Heparins), but depolymerization, per se, is not sufficient to obtain an oral heparin. In order to obtain by semi-synthesis new molecules of heparin derivates with high anti-Xa activity as well as the possibility of oral absorption, we have settled an original process which allows us, just in one step, both to substitute the sulfate group in the amino nitrogen of the heparin and to esterify specifically the hydroxy group in position 3 of the uronyl residue with the same acyl groups. Undoubtedly, this double substitution occurs if the hydroxy group has not been previously etherified or esterified.

PREFERRED EMBODIMENT

Our process to obtain heparins intended for oral administration, as claimed in the present invention, starts with heparins complexed with ammonium quaternary basis (NQ+). The complexes must be insoluble in water and therefore easily isolatable. They are well known in the literature, as for instance, complexes prepared with cetyl trimethyl ammonium or cetyl pyridinium halides. These complexes, although insoluble in water, can be split in saline solutions and they are soluble or can be solubilized in hydrate form in some organic solvents such as dimethylformamide (DMF), dimethylsulfoxide (DMSO) or acetic anhydride.

In the reaction of the present invention (see scheme 1), made with organic chlorides or anhydrides in the presence of an acyl carrier (pyridine or perchloride acid), the complexing agent —NQ+ acts as a protector, an esterification orientator and permits the reaction to occur in a homogeneous phase.

Scheme 1

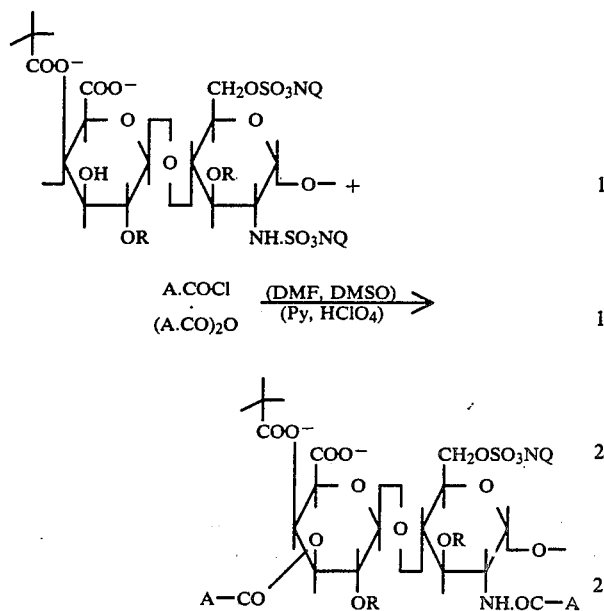

where:
R = H or SO$_3$NQ
A = alkyl, aryl or alkyl-aryl groups.

In a further step, —NQ is easily removed by splitting the reaction product in a saline solution (as for instance, 2M NaCl) and precipitating the compound by addition of a water-miscible solvent (ethanol, methanol, acetone), where NQ salts are soluble and therefore can be removed.

Compounds like those shown in scheme 2, are obtained in this way. These compounds are less hydrophylic and less ionized than the heparin and show high anti-Xa activity. More hydrophylic and more ionized compounds are obtainable if the uronic carboxy group is esterified before or after the reaction (see scheme 2, III) and if the residual sulfate groups are complexed, after the completion of the abovementioned reaction, with quaternary ammonium bases (NQ1), able to form water-soluble complexes in water, as for instance choline, betaine, carnitine, tetraethyl or tetrabutyl ammonium hydroxides (see scheme 2, IV).

As a whole, the entire process described in scheme 2, produces compounds II, III, IV, in high yield. All these compounds are endowed with anti-Xa activity and with less hydrophylia and ionicity than the starting heparin.

Scheme 2

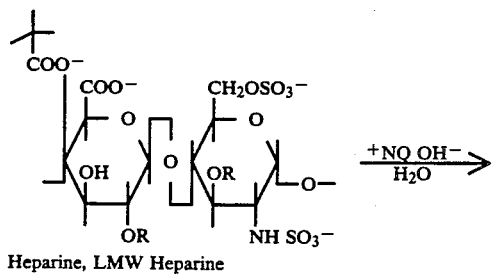
Heparine, LMW Heparine

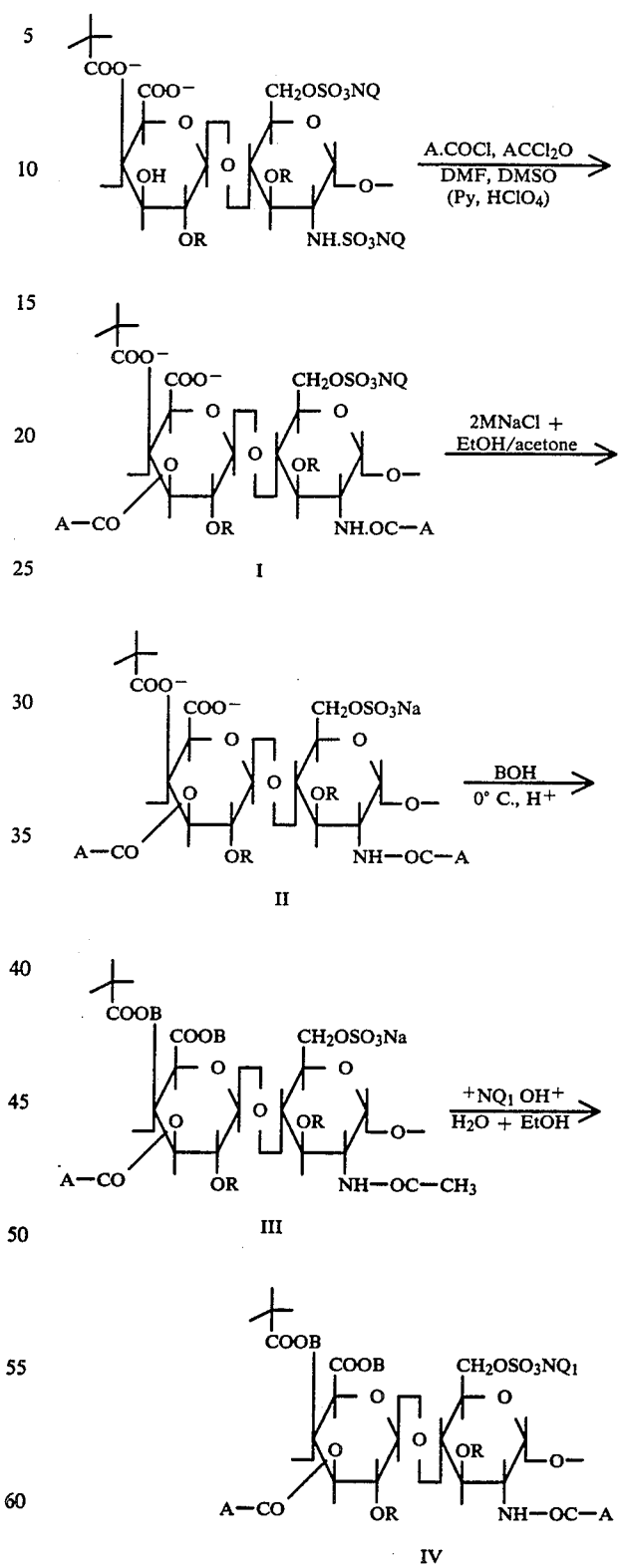

If an esterification on the carboxy group has been made before the acylation step, intermediate compounds with formula V, and their related complexes (VI), can be isolated:

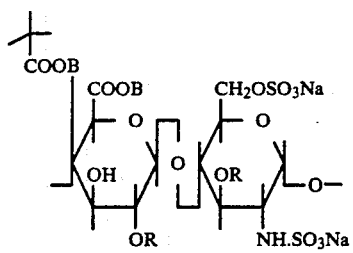

If the hydroxy group in position 3 of the uronyl residue has been already blocked by esterification or etherification, acylation will occur only in the amino group.

This pattern is useful in case it is desirable to obtain compounds having different substituents in the hydroxy group 3 and in the amino group.

The following examples, not limiting for the claims, describe better the procedure leading to products II, III, and IV of scheme 2.

EXAMPLE 1

(a) 20 g of a complex LMW Heparin-CTA (LMW Heparin=5500 D, USP potency=71 u/mg, anti-Xa=90 u/mg; CTA=cethyl trimethylammonium) are suspended in 100 ml DMF and 10 ml pyridine are added. Heat to 60° C. and add, dropwise and stirring, 8 ml of benzoyl chloride. The reaction is completed in 20 minutes. Add 1600 ml of 2% NaHCO, solution in water. Collect the precipitate (I) and dissolve in 100 ml of a 117 g/l NaCl solution. Precipitate with 300 ml of ethanol/acetone 1:1 mixture. Re-dissolve the precipitate in 30 ml of NaCl solution as above and reprecipitate with 100 ml ethanol/acetone. Collect the precipitate, dehydrate with acetone and vacuum dry. Yield: 10 g of II, showing positive reaction to hydroxylamine/$Fe^{III}$, USP potency=27 u/mg, anti-Xa=80 u/mg, APTT=23 u/mg.

(b) 10 g of II are suspended in 100 ml butanol at 5° C. and added with 0,5 ml of conc. HCl. Leave during 72 hours at 5° C. by stirring. Filter and repeatedly wash with acetone. Vacuum dry. Yield: 9 g of III showing very positive reaction with hydroxylamine/$Fe^{III}$, USP potency: 23, anti-Xa=85, and APTT=19.

(c) 9 g of III are dissolved in 50 ml of DI-water, add 1.50 g of choline chloride and precipitate the complex IV by addition of three volumes of a mixture 1:1 ethanol/acetone. Repeat this last step. Vacuum dry. Yield: 9 g of IV with USP potency=25, anti-Xa=90 and APTT=17.

EXAMPLE 2

(a) 20 g of V-CP complex (obtained by butilation of the uronic carboxy group in the heparin and subsequent isolation of the complex with cetylpyridinium chloride CPC) are suspended in 100 ml DMF and added with 10 ml pyridine and 5 ml DI-water. Heat to 50° C. and add by dropping and stirring 10 ml acetic anhydride. The reaction is completed in thirty minutes. Proceed as in Example 1a). Yield: 10 g of III, showing a strong positive reaction with hydroxylamine/$Fe^{III}$, USP potency=25 and anti-Xa activity=90.

(b) 9 g of III are dissolved in 50 ml of water. Proceed as in Example 1c). Yield: 9 g of IV with USP potency=22, anti-Xa=92.

EXAMPLE 3

(a) 20 g of Heparamine-3-butyl ether-CTA complex (obtained by N=desulfation of heparin, followed by etherification of uronic hydroxy group in position 3 and isolation of the complex obtained with cethyl trimethyl ammonium halide), are suspended in 100 ml of acetic anhydride and added with 0.5 ml of concentrated perchloric acid. Heat during 30 minutes by stirring at 30° C; add 800 ml of DI-water, collect the precipitate and dissolve it in 100 ml of a 117 g/l NaCl solution. Proceed as in Example 1a. Yield: 10 g of II, showing positive reaction with hydroxylamine/$Fe^{III}$, USP potency=10 and anti-Xa=75.

(b) 10 g of II are suspended as in Example 1b). Yield: 9 g of III, having a strong reaction with hydroxylamine/$Fe^{III}$, USP potency=12 and anti=Xa=84.

(c) 9 g of III are processed as in Example 1c). Yield: 9 g of IV. USP potency=12 and anti-Xa=90.

Table 1 hereinbelow enclosed summarizes comparative data for some of the compounds described in the examples, compared with the starting materials.

TABLE 1

| PRODUCT (Ref.: Scheme 2 and Examples 1 to 3) | $\overline{MW}$ (Calc.) | SCHEMATIC CHEMICAL FORMULA | USP POTENCY/mg | ANTI-Xa/mg | APTT/mg |
|---|---|---|---|---|---|
| USP HEPARIN | 12.500 | COONa / OH / NHSO$_3$Na | 150 | 150 | 150 |
| LMW HEPARIN | 5.500 | COONa / OH / NHSO$_3$Na | 71 | 90 | 60 |
| II (Ex 1) | 6.536 | COONa / OBZ / NHBZ | 27 | 80 | 23 |
| III (Ex 1) | 7.024 | COOBut / OBZ / NHBZ | 23 | 85 | 19 |

TABLE 1-continued

| PRODUCT (Ref.: Scheme 2 and Examples 1 to 3) | $\overline{MW}$ (Calc.) | SCHEMATIC CHEMICAL FORMULA | USP POTENCY/mg | ANTI-Xa/mg | APTT/mg. |
|---|---|---|---|---|---|
| IV (Ex 1) | 8.040 |  COOBut / OBZ / NHBZ × Chol. | 25 | 90 | 17 |
| V | 5.988 | 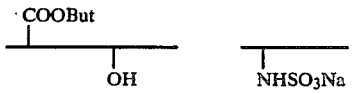 COOBut / OH / NHSO$_3$Na | 64 | 95 | 53 |
| III (Ex 2) | 5.969 | 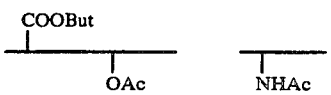 COOBut / OAc / NHAc | 25 | 90 | 18 |
| IV (Ex 2) | 6.049 | 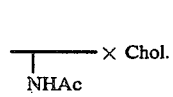 COOBut / OAc / NHAc × Chol. | 22 | 92 | 15 |
| II (Ex 3) | 4.796 | 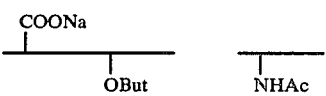 COONa / OBut / NHAc | 10 | 75 | 8 |
| III (Ex 3) | 5.095 |  COOBut / OBut / NHAc | 12 | 84 | 11 |
| IV (Ex 3) | 5.808 | 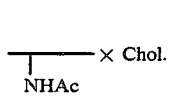 COOBut / OBut / NHAc × Chol. | 12 | 90 | 10 |

Abbreviations:
Ac = Acetyl;
Bz = Benzoyl;
But = butyl
Chol: Choline

We claim:

1. A method of producing a modified heparin having antithrombotic activity for oral administration, characterized by the presence of an acyl ester in the amino group of the glucosamine and in the hydroxy group 3 in the uronyl residue, comprising of the step of treating water insoluble heparin-quaternary ammonium complexes with organic chlorides or anhydrides in an homogeneous phase of organic solvents in the presence of an acyl-carrier catalyst, and at a temperature range of between room temperature and 80° C.

2. The method of claim 1, wherein the acyl-carrier catalyst is selected from the group consisting of pyridine and perchloric acids.

3. The method of claim 1, wherein the modified heparin produced is a 3-0-uronyl, N-glucosamine diacylated heparin having antithrombotic activity and is active by oral administration.

* * * * *